(12) United States Patent
Dascola et al.

(10) Patent No.: US 10,521,603 B2
(45) Date of Patent: Dec. 31, 2019

(54) VIRTUAL REALITY SYSTEM FOR PROVIDING SECURED INFORMATION

(71) Applicant: Branch Banking and Trust Company, Winston-Salem, NC (US)

(72) Inventors: Michael Anthony Dascola, Clayton, NC (US); Jacob Atticus Grady, Raleigh, NC (US); Joshua Christensen, Fuquay Varina, NC (US)

(73) Assignee: Branch Banking and Trust Company, Winston-Salem, NC (US)

( * ) Notice: Subject to any disclaimer, the term of this patent is extended or adjusted under 35 U.S.C. 154(b) by 154 days.

(21) Appl. No.: 15/683,972

(22) Filed: Aug. 23, 2017

(65) Prior Publication Data
US 2018/0060606 A1    Mar. 1, 2018

Related U.S. Application Data

(60) Provisional application No. 62/378,758, filed on Aug. 24, 2016.

(51) Int. Cl.
| | |
|---|---|
| *H04L 29/00* | (2006.01) |
| *G06F 21/62* | (2013.01) |
| *G06F 3/0481* | (2013.01) |
| *G06F 21/36* | (2013.01) |
| *G06F 3/01* | (2006.01) |
| *G06F 17/27* | (2006.01) |
| *G06F 3/0482* | (2013.01) |
| *G06T 19/00* | (2011.01) |

(52) U.S. Cl.
CPC ...... *G06F 21/6245* (2013.01); *G06F 3/04815* (2013.01); *G06F 21/36* (2013.01); *G06F 3/012* (2013.01); *G06F 3/013* (2013.01); *G06F 3/0482* (2013.01); *G06F 17/2705* (2013.01); *G06F 2221/2109* (2013.01); *G06T 19/006* (2013.01)

(58) Field of Classification Search
CPC .. G06F 21/6245; G06F 21/36; G06F 3/04815; G06F 17/2705; G06F 2221/2109; G06F 3/013; G06F 3/0482; G06F 3/012; G06T 19/006
See application file for complete search history.

(56) References Cited

U.S. PATENT DOCUMENTS 9,607,138 B1 * 3/2017 Baldwin ................. G06F 21/32
9,767,524 B2 * 9/2017 Hastings ................. G06F 21/10
(Continued)

OTHER PUBLICATIONS

Kim et al., "Remote Sensing and Control of an Irrigation System Using a Distributed Wireless Sensor Network", IEEE Transactions on Instrumentation and Measurement, vol. 57 , Issue: 7 , July (Year: 2015).*

*Primary Examiner* — Morshed Mehedi
(74) *Attorney, Agent, or Firm* — Kilpatrick Townsend & Stockton LLP

(57) ABSTRACT

A virtual reality (VR) or augmented reality (AR) system can be implemented for providing secured access to information and that is navigable using head or eye movements. The system can provide a three-dimensional environment that includes scenes with information that is available to all of the scenes and with secured information from an external source. Head or eye movements can allow a user to make selections, insert commands, etc. Security features can prevent a third party from viewing the secured information.

17 Claims, 12 Drawing Sheets

(56) References Cited

U.S. PATENT DOCUMENTS

| | | | |
|---|---|---|---|
| 2010/0122182 A1* | 5/2010 | Bromenshenkel | G06F 3/011 |
| | | | 715/745 |
| 2010/0329466 A1* | 12/2010 | Berge | H04R 3/12 |
| | | | 381/22 |
| 2014/0068713 A1* | 3/2014 | Nicholson | H04W 12/06 |
| | | | 726/3 |
| 2014/0364209 A1* | 12/2014 | Perry | G06F 3/013 |
| | | | 463/31 |
| 2016/0217612 A1* | 7/2016 | Petill | G06T 19/006 |
| 2016/0242035 A1* | 8/2016 | Chaillan | H04W 12/08 |
| 2016/0267759 A1* | 9/2016 | Kerzner | G08B 13/19645 |
| 2016/0358181 A1* | 12/2016 | Bradski | G06Q 20/40145 |
| 2017/0165573 A1* | 6/2017 | Froy | G06F 3/005 |
| 2017/0172675 A1* | 6/2017 | Jarc | A61B 90/361 |
| 2017/0244811 A1* | 8/2017 | McKenzie | H04W 76/14 |

\* cited by examiner

VIRTUAL REALITY SYSTEM FOR PROVIDING SECURED INFORMATION

CROSS-REFERENCE TO RELATED APPLICATIONS

This claims priority to U.S. Provisional Application Ser. No. 62/378,758, titled "Virtual Reality System for Providing Secured Information" and filed Aug. 24, 2016, the entirety of which is incorporated herein by reference.

TECHNICAL FIELD

The present disclosure relates to a virtual reality system. Some examples relate to a virtual reality system with which users can securely access sensitive information.

BACKGROUND

A virtual reality system can provide an enriched experience for a user. For example, games can be enhanced by appearing in three-dimensions, and mimic or represent more realistic images and sounds. Users may also experience vibrations and other sensations through associated haptic device systems. Interaction with objects displayed in a virtual environment often requires users to make a physical selection of a control, such as a physical button, to provide input, control objects, and otherwise interact with the environment. These types of requirements can often inhibit user interaction, particularly for users that may be disabled or otherwise lack the full use of hands and other extremities. Furthermore, sensitive information in virtual environments may be easily compromised because the focus of the environment is on providing a virtual experience rather than on protecting information that may be displayed.

SUMMARY

In one example, a system includes a device with a processor and a non-transitory medium that includes code that is executable by the processor for generating a three-dimensional, virtual reality environment that is displayable on a display device and that is controllable from user head movements and gaze inputs detected by the display device for managing secured information that is accessible via the three-dimensional, virtual reality environment.

In another example, a non-transitory, computer-readable medium includes code that is executable by a processor for generating a three-dimensional environment that is displayable on a display device and that is controllable from user head movements and gaze inputs detected by the display device for managing secured information that is accessible via the three-dimensional environment.

In another example, a method includes generating a three-dimensional, virtual reality environment, displaying the three-dimensional, virtual reality environment on a display device, receiving user head movements and gaze inputs detected by the display device, and in response to the user head movements and the gaze inputs, managing access to secured information that is displayed in the three-dimensional, virtual reality environment.

DETAILED DESCRIPTION

Figure 1:
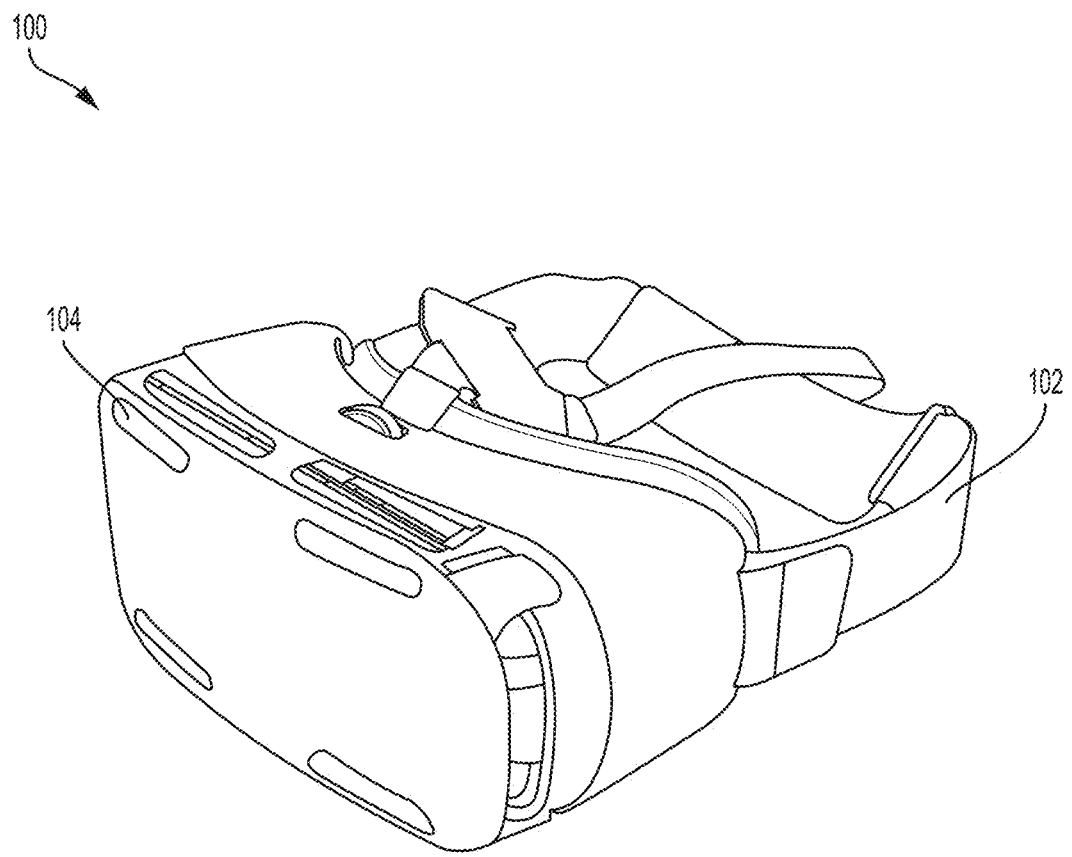
FIG. 1 is a perspective view of an example of a headset usable with a virtual reality (VR) application or an augmented reality (AR) application according to some examples of the present disclosure.

Certain aspects and features of the present disclosure relate to a virtual reality (VR) or augmented reality (AR) system for providing secured access to information and that is navigable using head or eye movements. The system can provide a three-dimensional environment that includes scenes with information that is available to all of the scenes and with secured information from an external source. Head or eye movements can allow a user to make selections, insert commands, etc. Security features can prevent a third party from viewing the secured information.

Systems for accessing and managing secured information can be difficult for users with physical disabilities to use successfully. Most systems require the use of movement of hands and fingers to manipulate controls, provide input, and otherwise access information. Systems that may provide more accessibility options, however, may be less secure. For example, a third party may be able to access the secured information.

A system according to some examples can be used with a VR headset to provide an environment in which users with various physically disabilities can interact and control secured information. For example, a user can wear a headset and position the user's head or eyes on a target viewable via the headset to select the target and provide a command for accessing or managing secured information without using hands or fingers. Sound effects, user-interface transition effects, and other signaling features can provide feedback, instruction, and directions, and reduce motion sickness.

Various examples can include features for allowing a user to access and manage information securely without using hands. Examples of features include transferring information between scenes rather than recreating and obtaining the information again for a scene, adding storable data to dropdown menus in the VR environment, sprite animations (e.g., visual items in a scene move around in response to actions by the user), gaze input, custom background views, audio cues and instructions (e.g., as a user hovers over an object in a scene, the system outputs sound or a three-dimensional sound is provided to orient the user within the environment), and gaze tracking for logging into the environment. Additional examples can include providing video tutorials while the user is accessing the environment, automatic logout on headset removal, visual breadcrumbs using scene changes to represent financial transaction functions, custom animations, information contained on a single screen, and specific login gaze inputs set by the user.

Information from one scene can be carried over to the next scene. For example, as the next scene is being generated, the system can cause certain information from the current scene to be included as a variable in the code on which the next scene is being generated. A scene can be different virtual environments within an overall three-dimensional VR system. Secured information can be dynamically retrieved from a third-party database source and included with the information carried over between scenes in a scene. The information can include video content, pictures, icons, texts, and other representations of information.

In one example, a three-dimensional virtual environment is provided that allows users to control and manage financial data without requiring the use of the user's hands.

Various security features can be included. For example, the system can automatically log a user out from being able to access information when the headset is removed from the head. In response to receiving an indication from the headset that it is moving from a position at a user's head, the system can trigger a log-out function to log the user out of the system. This can prevent someone from accessing the secured information associated with a physically challenged user without the user's permission. In other examples, a selectable option can be included in one or more of the scenes and causes the system to log the user out from accessing secured information in response to a selection of it.

FIG. 1 is a perspective view of an example of a headset 100 usable with a VR or AR application. The headset 100 can include a strap 102 that can wrap around a user's head to maintain the headset 100 in position while being worn on the user's head. The headset 100 in position on the user's head can allow the eyes of the user to view, through a lens in the headset 100, a screen housed in a front portion 104 of the headset. The screen can be from a smart phone, or other separate device, or included in the headset 100.

Figure 2:
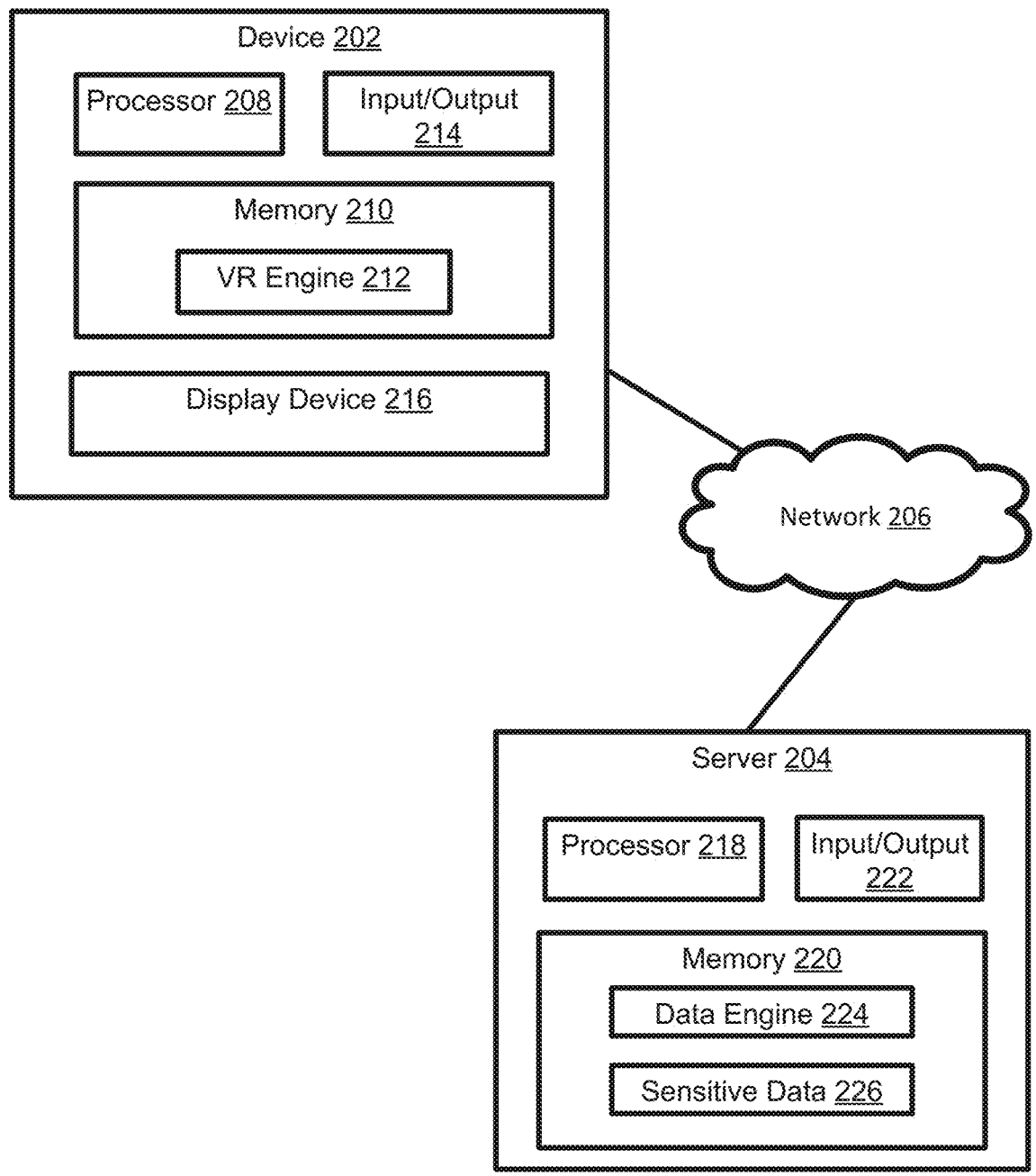
FIG. 2 is a schematic block diagram of a system for providing a VR environment via a display device according to some examples of the present disclosure.

FIG. 2 depicts an example in block diagram form of a system for providing the VR environment via a screen. The system can include a device 202 and a server 204 that can communicate with the device 202 via a network 206. The device 202 can be a smart phone that includes a processor device 208 and a memory device 210. The processor device 208 can be, or include, any device that can execute instructions to cause the device 202 to perform actions. Examples of the processor device 208 include a microprocessor, an ASIC, and an FPGA. Instructions can be stored in the memory device 210. The memory device 210 can be, or include, any non-transitory computer-readable medium for storing data and instructions. Examples of the memory device include optical storage device, magnetic storage devices, DRAM, RAM, and flash memory devices. The instructions can include a virtual reality engine 212 that can be executed by the processor device 208 to generate and display a VR or AR environment. The memory device 210 can also store other types of data, such temporary data received from a third-party source for use in the VR environment.

The device 202 also includes an input/output 214 that can allow the device 202 to communicate with other devices and systems. For example, the input/output 214 can allow the device 202 to wirelessly receive data from a third party, such as via a cellular or a Wi-Fi communication path. Examples of the input/output 214 include a wireless network port that can include or couple to an antenna for capturing wireless signals that include data from other devices and for wirelessly transmitting signals to the other devices. The input/output 214 may additionally or alternatively include a mechanical switch or a sensor that can detect when the device 202 is decoupled from a headset, or when the headset is removed from a user's head. The device 202 includes a display device 216 that can output a visual representation of the VR or the AR environment. The display device 216 can also detect inputs via a gaze input, such as by being able to detect the focus of a user's eyes on a particular part of the VR environment being displayed by the display device 216.

Although the device 202 may be a smart phone in some examples, other types of devices can be used. For example, the device 202 can be a tablet computer, a laptop computer, or other processor-based device that can provide a visual VR environment for use with a headset. In some examples, the device 202 is part of the headset itself.

The server 204 can provide through the network 206 information used to generate the VR environment by the device 202. The server 204 can include a processor device 218, a memory device 220, and an input/output 222. The processor device 218 and the memory device 220 may be similar to the processor device 208 and the memory device 210 of the device 202. The input/output 222 may be a communication port through which the server 204 communicates with the network via Internet Protocol communication packets or another communication protocol.

The memory device 220 can include a data engine 224 and stored sensitive data 226. The data engine 224 can be executed by the processor device 218 for controlling the data or commands transmitted to the device 202 via the input/output 222 for use in generating the VR environment. The sensitive data 226 may include personal identification information, financial information, or other protected information. The data engine 224 can control when the sensitive data 226 is transmitted to the device 202 and cause access protections (e.g., automatically expiring features) to the sensitive data 226. In some examples, the server 204 can receive data from another device and the data engine 224 can facilitate communicating that data to the device 202. The data engine 224 can also facilitate communicating data from the device 202 to the other device. For example, content that is provided for display in the virtual environment may include a video chat function that allows the wear to see video of another person and communicate voice or other information to the other person.

Figure 3:
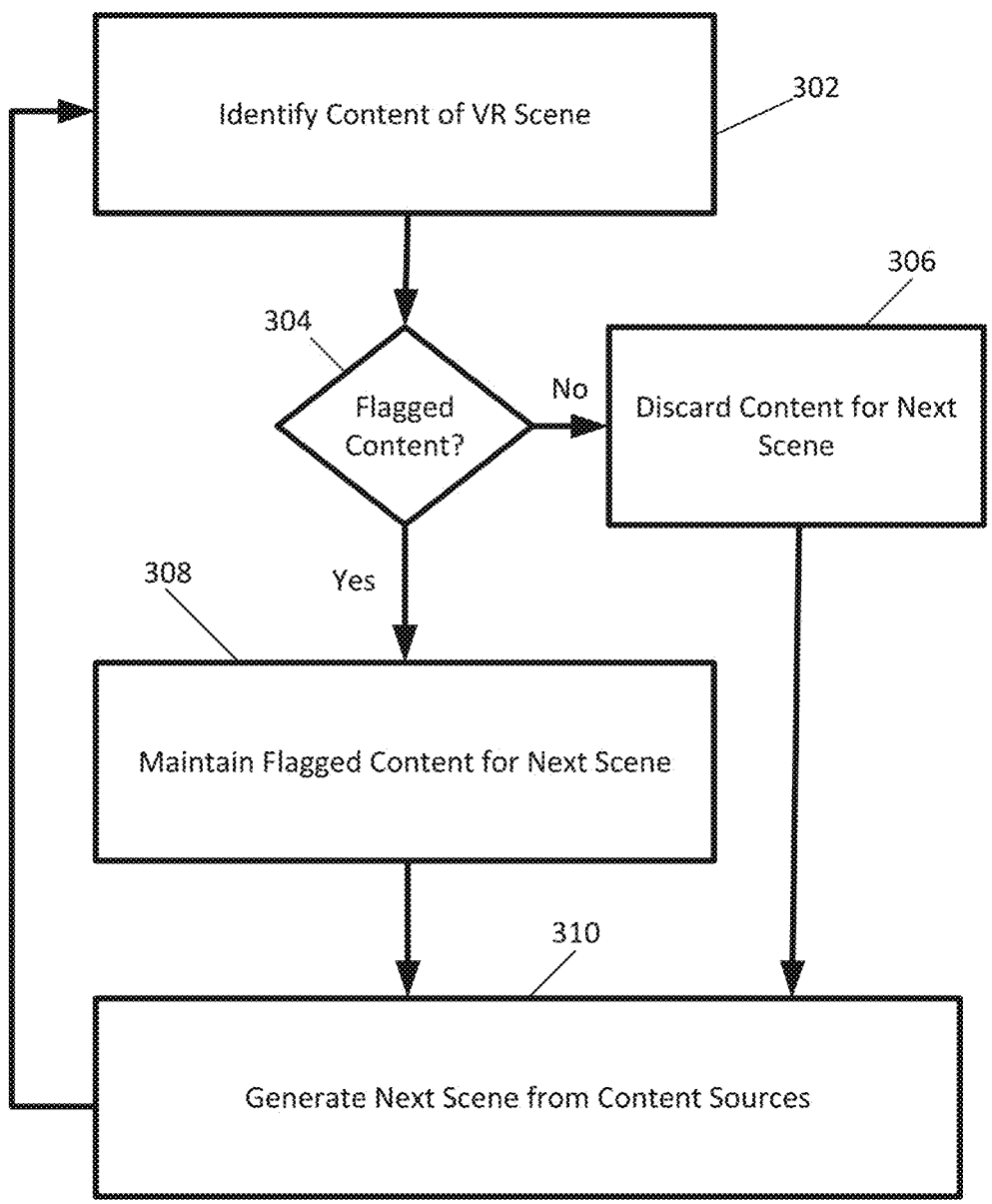
FIG. 3 is a flowchart of a process for generating scenes of a VR environment according to some examples of the present disclosure.

The virtual reality engine 212 of the device 202 can generate scenes for the VR environment using the data and commands received from the server 204, along with information and instructions stored in the device 202. FIG. 3 is a flowchart of an example of a process that can be implemented by the processor device 208 executing the virtual reality engine 212 of the device 202 for generating scenes of a VR environment.

In block 302, the virtual reality engine 212 identifies content of a VR scene. A VR scene can include various, different types of content. Examples of content include background imagery, foreground imagery, selectable icons, static icons, and personal and sensitive data elements. The various different types of content of a scene can be identified by the virtual reality engine 212 by analyzing the code being executed to generate the VR scene, parsing the code into elements, and categorizing the elements into different types of content. The virtual reality engine 212 can generate a relationship table with an identifier for each element that specifies the type of content for that element. The identifier can be a flag for content that is shared among multiple scenes. For example, certain types of elements can be designated as being shared among multiple scenes and the identifier for those types of elements can include a flag.

In block 304, the virtual reality engine 212 determines whether the different content from the current scene is flagged by, for example, analyzing the relationship table. If the content is not flagged, the content is discarded for the next scene in the VR environment in block 306. The content can be discarded by the virtual reality engine 212 associating a variable with the code for the content that causes the content to be discarded in response to the next scene being generated. If the content is flagged, the content is maintained for the next scene in block 308. The content can be maintained for the next scene by the virtual reality engine 212 associating a variable with the code for the content that causes the content to be maintained in response to the next scene being generated.

In block 310, the virtual reality engine 212 generates the next scene from content sources. The next scene can be generated in response to a user selection in the VR environment or in response to an expiry of a pre-set amount of time from when the current scene was generated. The content sources can include content from the current scene that is maintained and content stored in the memory device 210 that can be used to replace content elements from the current scene that are discarded. The sources of content can also include from the server 204.

After the next scene is generated, the process can return to block 302 at which the content of the next scene is identified and the process can repeat. By maintaining content shared among multiple scenes of a VR environment, scenes for the VR environment can be generated faster, and less memory space may be necessary to supply content for the VR environment.

Figure 4:
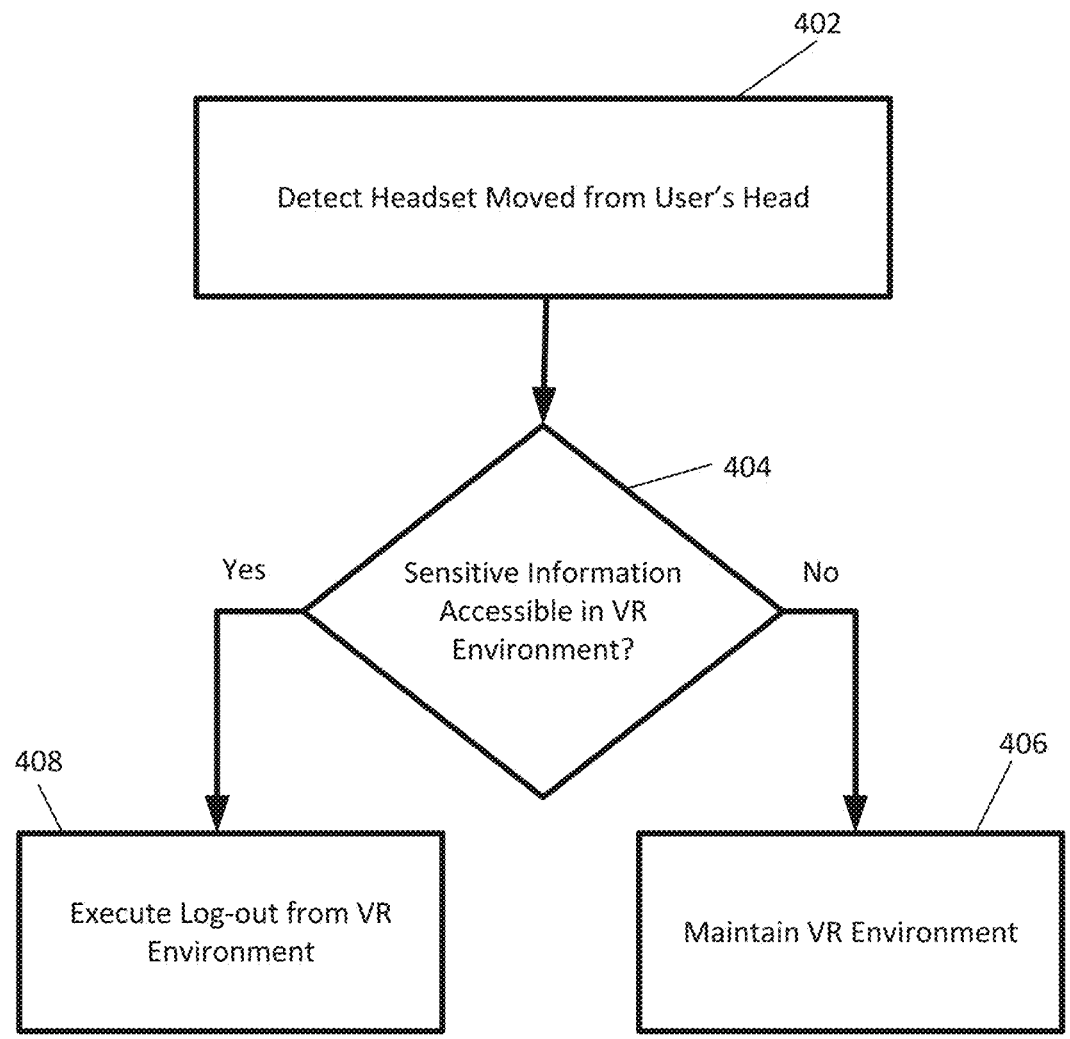
FIG. 4 is a flowchart of a process for protecting sensitive information in a VR environment according to some examples of the present disclosure.

A system according to some examples can also prevent sensitive information from being accessed by unauthorized users. For example, should a user that authenticated into the VR environment remove the headset, it may be possible for another person to put on the headset and view or access sensitive information. FIG. 4 is a flowchart of a process for protecting sensitive information in a VR environment according to one example.

In block 402, the system detects that a headset is moved from a user's head. For example, a headset may include a pressure or content sensor that outputs a signal to the device in response to pressure releasing or not being in content with the user's head. In other examples, the device includes a sensor that can detect a headset moving from a user's head. The virtual reality engine 212 can receive the signals representing that the headset has moved from a user's head.

In block 404, the virtual reality engine 212 determines whether sensitive information is accessible in the VR environment, both a current scene and via selectable options to progress to other scenes. For example, the virtual reality engine 212 can analyze the data of the VR environment to identify the types of content and whether any is associated with a sensitive information identifier. In other examples, the virtual reality engine 212 can confirm that the user authenticated into the VR environment. If no sensitive information is accessible in the VR environment, the virtual reality engine 212 can maintain the VR environment and access to the VR environment in block 406. If sensitive information is accessible in the VR environment, the virtual reality engine 212 can execute a log-out function to cause the device to log-out from the VR environment in block 408.

Figure 5:
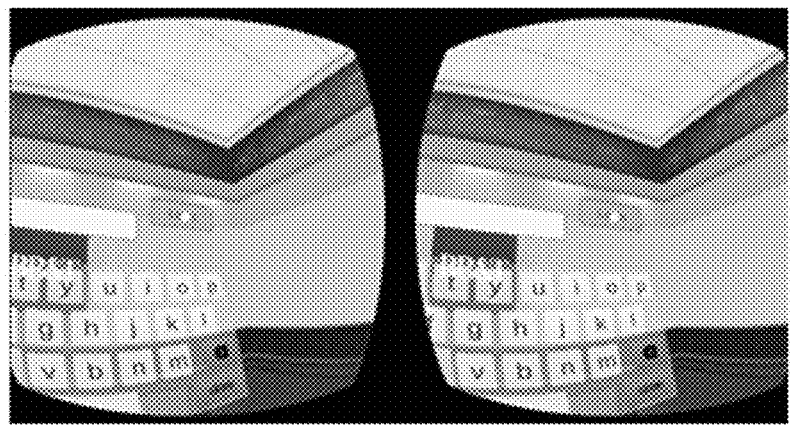
FIG. 5 depicts an example of a scene through lenses of a headset via which items can be selected via head movements and gazing according to some examples of the present disclosure.

FIGS. 5-14 depict examples of interfaces for VR environments according to certain examples. FIG. 5 depicts an example of a scene through lenses of the headset. The scene can be shown as a right-eye and a left-eye image that, when viewed through the lenses, produces a three-dimensional view of the environment. A cursor can be controlled via head movements and gazing at an object (such as a login button in FIG. 5) can cause the object to be selected. For example, the virtual reality engine 212 can monitor cursor position and identify a selection of a selectable item in the scene in response to the cursor position being maintained on the selectable item for a pre-set amount of time.

Figure 6:
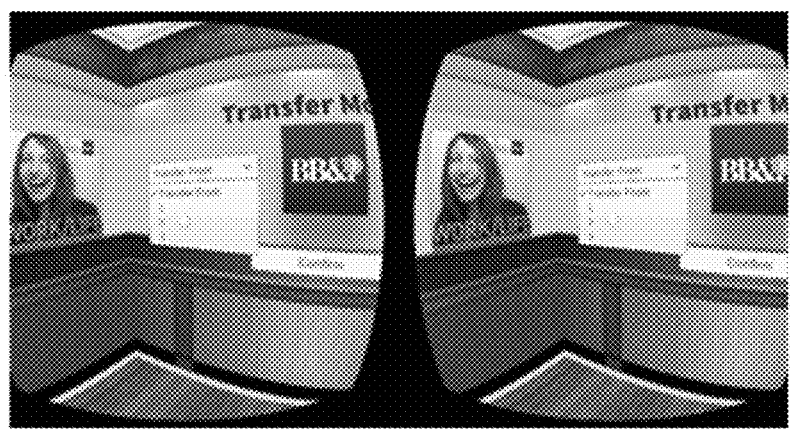
FIG. 6 depicts an example of a scene subsequent to a login process according to some examples of the present disclosure.
Figure 7:
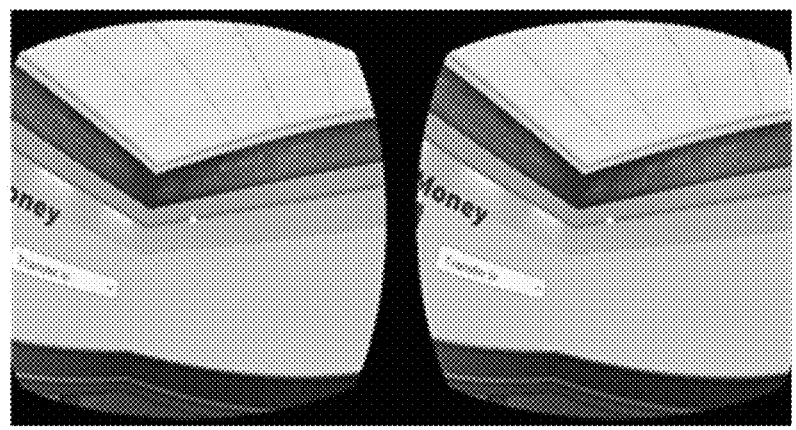
FIG. 7 depicts another part of the scene of FIG. 6 (which may alternatively be a separate scene) with another example of a selectable drop-down menu according to some examples of the present disclosure.
Figure 8:
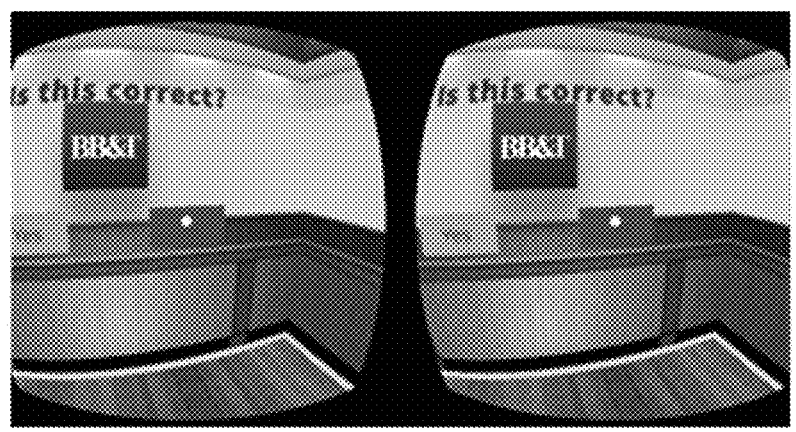
FIG. 8 depicts an example of selection of a "No" option by gazing at the option according to some examples of the present disclosure.

FIG. 6 depicts an example of a scene subsequent to a login process. A drop-down menu is shown in this scene by which a head-controlled cursor can be used to select and confirm an option from the menu. FIG. 7 depicts another part of the scene of FIG. 6 (or may be a separate scene) with another example of a selectable drop-down menu. FIG. 8 depicts an example of selection of a "No" option by gazing at the option by the user for a pre-set amount of time. The pre-set amount of time may be preconfigured in a virtual reality engine, or the engine can learn from prior use by the user as to how long a gaze on a position is to be to signify that the user is selecting the option.

Figure 9:
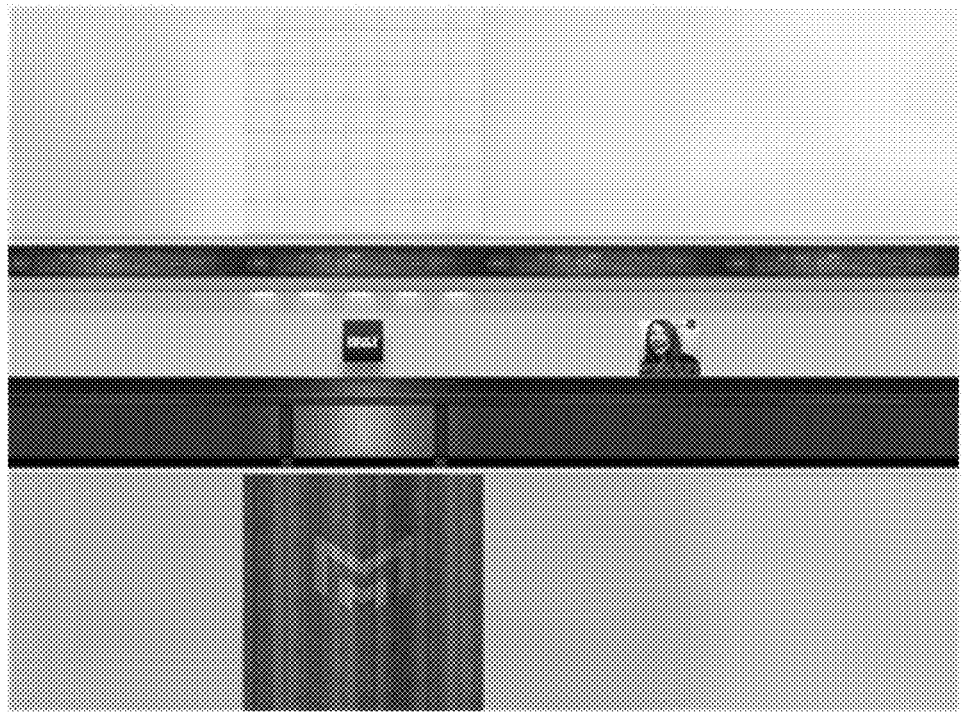
FIG. 9 is an example of a scene as a person shown in a manner that a user would view when looking through the lenses of the headset according to some examples of the present disclosure.
Figure 10:
FIG. 10 depicts an example of selectable options and information that is promulgated through various scenes of a VR environment according to some examples of the present disclosure.

FIG. 9 is an example of a scene as a person shown in a manner that a user would view when looking through the lenses of the headset. FIG. 10 depicts an example of selectable options and information (e.g., "Karen") that is promulgated through various scenes. For example, the text "Karen" may be associated with a flag that designates that the content is to be included in a subsequent scene that is generated.

Figure 11:
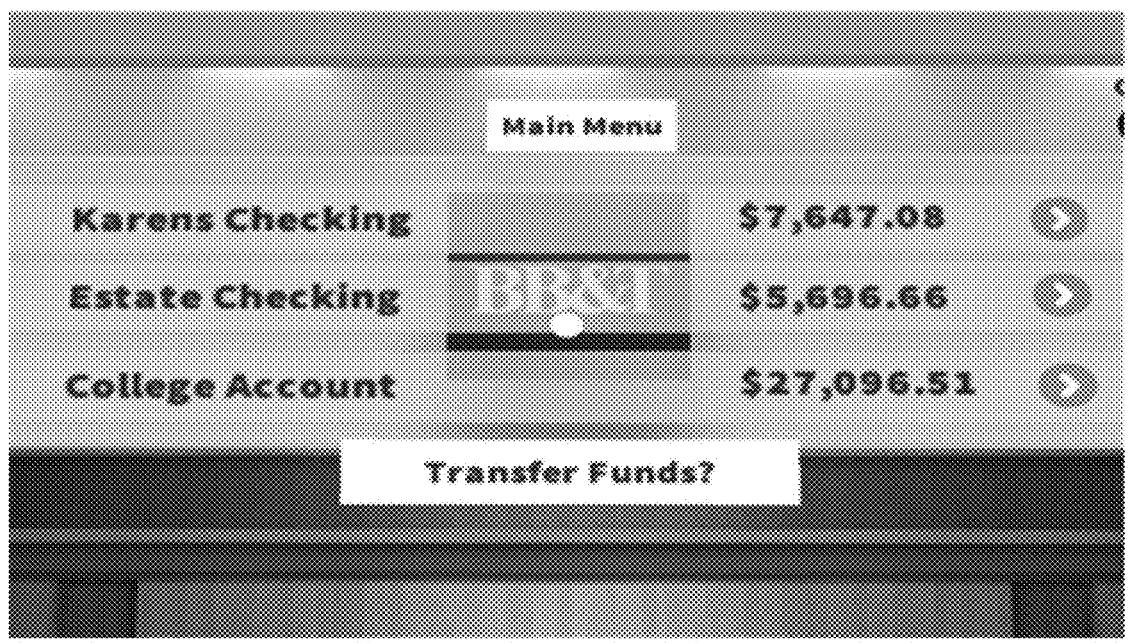
FIG. 11 shows an example of a scene by which the user can manage secured information without requiring the use of hands according to some examples of the present disclosure.

FIG. 11 shows an example of a scene by which the user can manage secured information without requiring the use of hands. For example, the cursor can follow the gaze of the user and be used by the user to provide inputs into the system without requiring the use of hands.

Figure 12:
FIG. 12 shows an example of a user transferring funds among accounts and also includes a quick log-out option for security according to some examples of the present disclosure.

FIG. 12 shows an example of a user transferring funds among accounts and also includes a quick log-out option ("Quit") for security. For example, the "Quit" option can be quickly selected by a cursor staying on it for a shorter amount of time than for selecting other options. In response to the "Quit" option being selected, the system can logged the user out of the VR environment.

Figure 13:
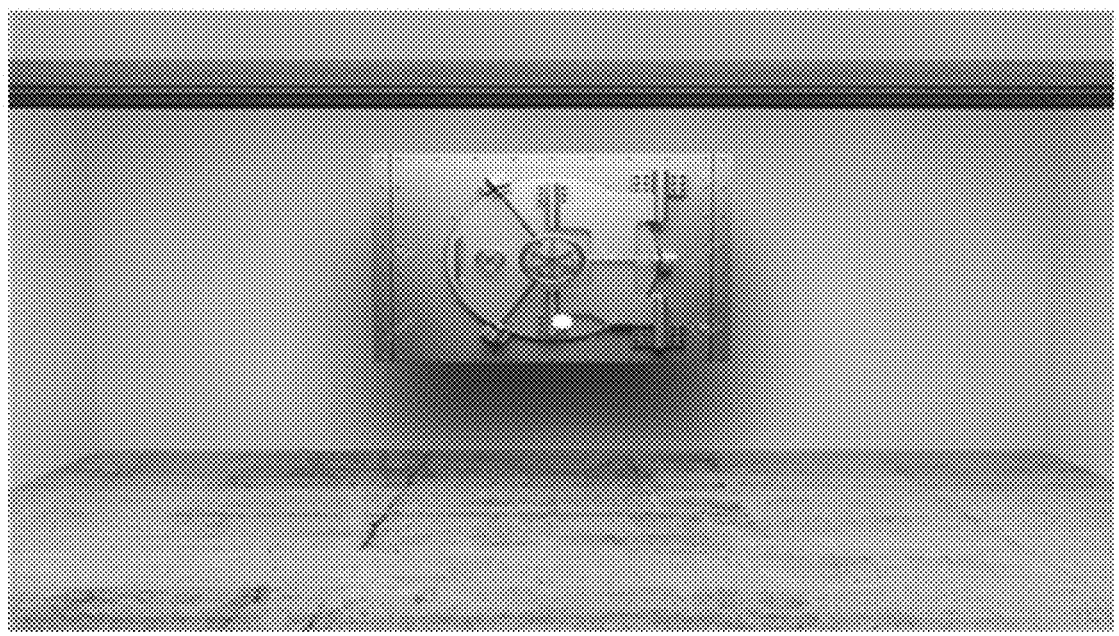
FIG. 13 depicts a selectable representation of a bank vault that can be included in a login process that requires a user to select certain items or select items in a certain order to authenticate the user according to some examples of the present disclosure.

FIG. 13 depicts a selectable representation of a bank vault that can be included in a login process that requires a user to select certain items or select items in a certain order to authenticate the user. For example, the user may have pre-set certain objects to select to authenticate the user, and the order in which the objects are to be selected. In response to the system receiving a matching selection of objects in the specified order, the user can be authenticated.

Figure 14:
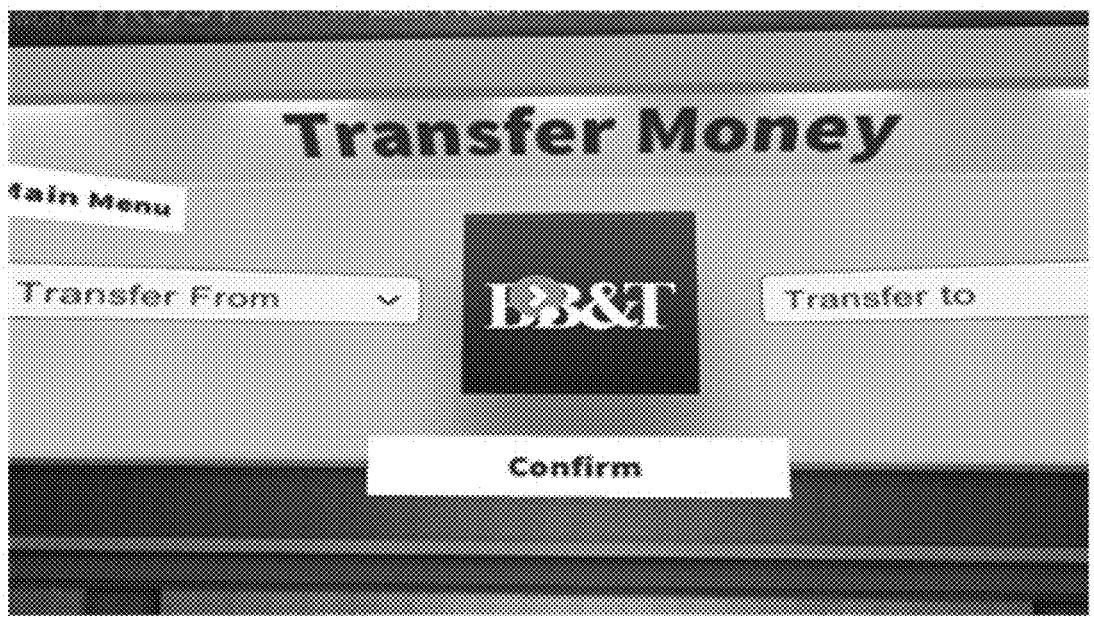
FIG. 14 is an example of a scene for managing secured information by using head position and gaze inputs according to some examples of the present disclosure.
Figure 15:
FIG. 15 depicts a further action of the scene of FIG. 14 that includes a drop down menu for performing actions according to some examples of the present disclosure.

FIG. 14 is an example of a scene for managing secured information by using head position and gaze inputs. FIG. 15 depicts a further action of the scene of FIG. 14 that includes a drop down menu for performing actions.

A three-dimensional VR environment according to some examples can replicate the experience of a user in a brick-and-mortar store associated with managing secured information. The environment can allow users to view options and scenes similar to those in a brick-and-mortar store and manage secured information without requiring the use of hands. A physically challenged user can thus experience a brick-and-mortar store experience while securely managing secured information.

Figure 16:
FIG. 16 depicts an example of a scene of an office environment within a vault according to some examples of the present disclosure.

In other examples, a three-dimensional VR environment can replicate some things from a store, but do so in a creative manner. For example, a scene can show an office built inside a vault. FIG. 16 depicts an example of a scene of an office environment within a vault.

Figure 17:
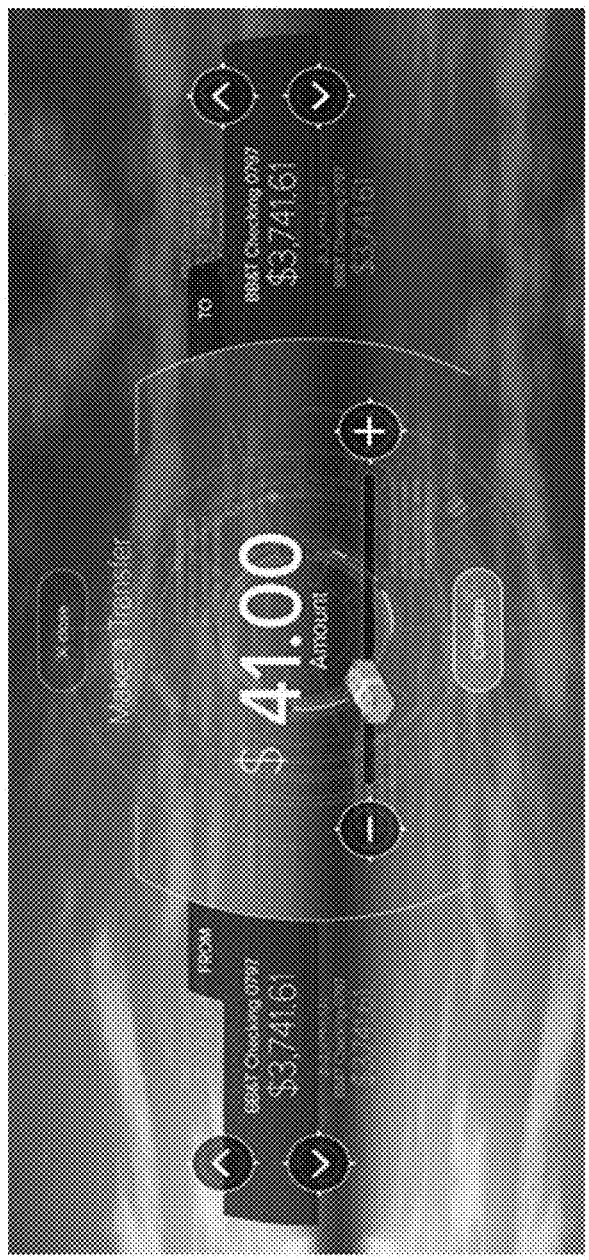
FIG. 17 depicts an interface for making a fund transfer via a virtual reality environment according to some examples of the present disclosure.
Figure 18:
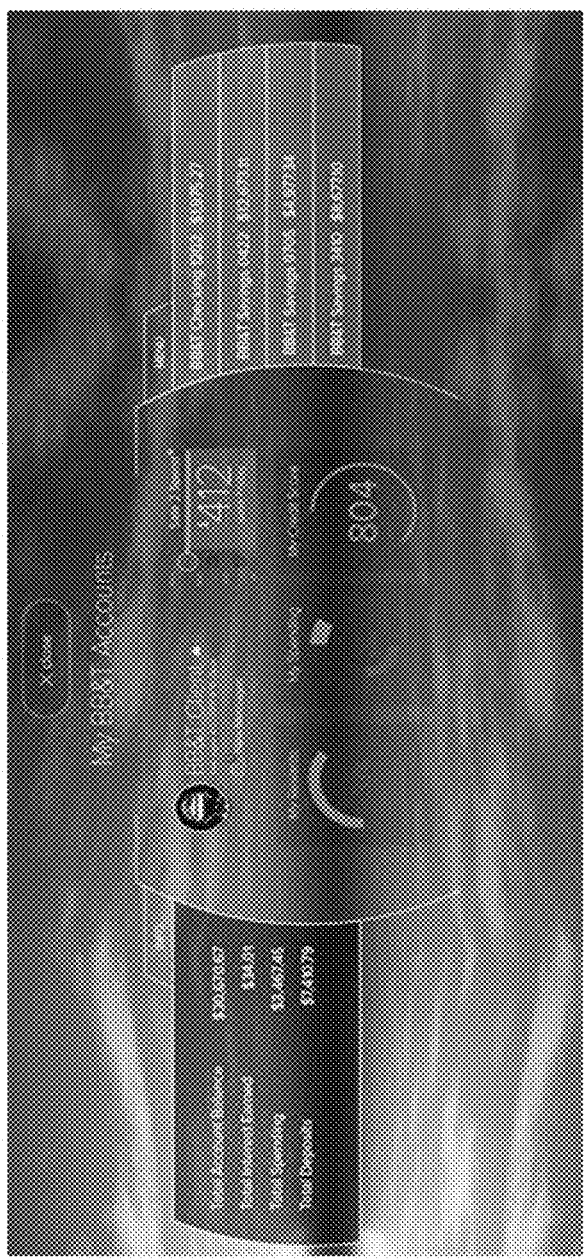
FIG. 18 depicts an interface for viewing account information via a virtual reality environment according to some examples of the present disclosure.

FIGS. 17 and 18 depict additional examples of interfaces for a virtual environment. These interfaces include a layout of content, such as text, to mimic how viewers naturally read—e.g., from left to right—as compared to stacked content from top to bottom. The eyes of a user can be led to a particular place in the interface while maintaining content within a user's field of view. FIG. 17 depicts an example of a user inputting a request to transfer funds from one account to other, using gaze and head movement inputs. FIG. 18 depicts an example of user account information with options that are selectable by gaze and head movement inputs for accessing additional information about the options.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A system comprising:
   a processor; and
   a non-transitory medium that includes code that is executable by the processor for:
   generating a three-dimensional, virtual reality environment;
   displaying the three-dimensional, virtual reality environment on a display device of a headset;
   detecting user head movements and gaze inputs via the headset;
   in response to the user head movements and the gaze inputs, managing secured financial information that is accessible via the three-dimensional, virtual reality environment;
   detecting that the headset has been removed from a user's head;
   determining that the secured financial information is accessible via the three-dimensional, virtual reality environment; and
   in response to detecting that the headset has been removed from the user's head and determining that the secured financial information is accessible via the three-dimensional, virtual reality environment, executing an automatic log-out function to prevent the secured financial information from being accessible.

2. The system of claim 1, wherein the code is executable by the processor for:
   identifying content of a current virtual reality scene in the three-dimensional, virtual reality environment;
   determining that the content includes at least one content element associated with a flag and at least one other content element unassociated with the flag;
   discarding the at least one other content element for a subsequent scene in the three-dimensional, virtual reality environment;
   maintaining the at least one content element associated with the flag for the subsequent scene in the three-dimensional, virtual reality environment; and
   generating the subsequent scene by using the at least one content element and at least one other content element from a content source.

3. The system of claim 2, wherein the code is executable by the processor for identifying the content of the current virtual reality scene by:
   analyzing code for the current virtual reality scene to determine types of content elements for content elements included in the current virtual reality scene; and
   categorizing the content elements into the types of content elements by associating identifies of the types of content elements to the content elements.

4. The system of claim 1, wherein the code is executable by the processor to:
   generate a scene in the three-dimensional, virtual reality environment for implementing an authentication process to access the secured financial information, the scene being displayable and including a plurality of selectable objects; and
   authenticate a user to access the secured financial information only in response to receiving a selection of a subset of objects of the plurality of selectable objects in an order matching a stored list of subset of objects and the order for selecting the subset of objects.

5. The system of claim 1, further comprising:
   a server communicatively coupled to the processor through a network, the server comprising banking information and code that is executable by the server for controlling transmission of the banking information and other content to the processor for use in generating scenes for the three-dimensional, virtual reality environment.

6. A non-transitory, computer-readable medium comprising code that is executable by a processor for:
generating a three-dimensional environment that is displayable on a display device of a headset and that is controllable from user head movements and gaze inputs detected by the headset for managing secured financial information that is accessible via the three-dimensional environment;
detecting that the headset has been removed from a user's head;
determining that the secured financial information is accessible via the three-dimensional environment; and
in response to detecting that the headset has been removed from the user's head and determining that the secured financial information is accessible via the three-dimensional environment, executing an automatic log-out function to prevent the secured financial information from being accessible.

7. The non-transitory, computer-readable medium of claim 6, wherein the code is executable by the processor for:
identifying content of a current scene in the three-dimensional environment;
determining that the content includes at least one content element associated with a flag and at least one other content element unassociated with the flag;
discarding the at least one other content element for a subsequent scene in the three-dimensional environment;
maintaining the at least one content element associated with the flag for the subsequent scene in the three-dimensional environment; and
generating the subsequent scene by using the at least one content element and at least one other content element from a content source.

8. The non-transitory, computer-readable medium of claim 7, wherein the code is executable by the processor for identifying the content of the current scene by:
analyzing code for the current scene to determine types of content elements for content elements included in the current scene; and
categorizing the content elements into the types of content elements by associating identifies of the types of content elements to the content elements.

9. The non-transitory, computer-readable medium of claim 6, wherein the code is executable by the processor to:
generate a scene in the three-dimensional environment for implementing an authentication process to access the secured financial information, the scene being displayable and including a plurality of selectable objects; and
authenticate a user to access the secured financial information only in response to receiving a selection of a subset of objects of the plurality of selectable objects in an order matching a stored list of subset of objects and the order for selecting the subset of objects.

10. The non-transitory, computer-readable medium of claim 6, wherein the three-dimensional environment is a virtual reality environment or an augmented reality environment.

11. A computer-implemented method comprising:
generating a three-dimensional, virtual reality environment;
displaying the three-dimensional, virtual reality environment on a display device of a headset;
detecting user head movements and gaze inputs via the headset;
in response to the user head movements and the gaze inputs, managing secured financial information that is accessible via the three-dimensional, virtual reality environment;
detecting that the headset has been removed from a user's head;
determining that the secured financial information is accessible via the three-dimensional, virtual reality environment; and
in response to detecting that the headset has been removed from the user's head and determining that the secured financial information is accessible via the three-dimensional, virtual reality environment, executing an automatic log-out function to prevent the secured financial information from being accessible.

12. The method of claim 11, further comprising:
identifying content of a current virtual reality scene in the three-dimensional, virtual reality environment;
determining that the content includes at least one content element associated with a flag and at least one other content element unassociated with the flag;
discarding the at least one other content element for a subsequent scene in the three-dimensional, virtual reality environment;
maintaining the at least one content element associated with the flag for the subsequent scene in the three-dimensional, virtual reality environment; and
generating the subsequent scene by using the at least one content element and at least one other content element from a content source.

13. The method of claim 12, wherein identifying the content of the current virtual reality scene comprises:
analyzing code for the current virtual reality scene to determine types of content elements for content elements included in the current virtual reality scene; and
categorizing the content elements into the types of content elements by associating identifies of the types of content elements to the content elements.

14. The method of claim 11, further comprising:
generating a scene in the three-dimensional, virtual reality environment for implementing an authentication process to access the secured financial information, the scene including a plurality of selectable objects; and
authenticate a user to access the secured financial information only in response to receiving a selection of a subset of objects of the plurality of selectable objects in an order matching a stored list of subset of objects and the order for selecting the subset of objects.

15. The system of claim 1, wherein the secured financial information includes information about a bank account.

16. The system of claim 15, wherein the information about the bank account includes an account balance associated with the bank account.

17. The system of claim 1, wherein the three-dimensional, virtual reality environment comprises at least one virtual button for effectuating a transfer of money between bank accounts.

* * * * *